March 27, 1962

A. FLAN 3,027,112

AUTOMATIC MAGAZINE TYPE TAPE MECHANISM

Filed July 1, 1958

3 Sheets-Sheet 1

Inventor
Anthony Flan
George E. Frost
Attorney

March 27, 1962 A. FLAN 3,027,112

AUTOMATIC MAGAZINE TYPE TAPE MECHANISM

Filed July 1, 1958 3 Sheets-Sheet 2

Inventor
Anthony Flan
George E. Frost
Attorney

Inventor
Anthony Flan
George E. Frost
Attorney 3,027,112
AUTOMATIC MAGAZINE TYPE TAPE MECHANISM
Anthony Flan, 1050 Hinman, Evanston, Ill.
Filed July 1, 1958, Ser. No. 746,314
6 Claims. (Cl. 242—55.13)

My invention relates to an automatic magazine type tape driven mechanism which automatically grips and transports tape upon insertion of the magazine without further operation.

In accordance with the present invention, insertion of the magazine into the mechanism serves to erect a pinch roller from its retracted position and to develop the force on the pinch roller to provide the friction grip necessary to transport the tape at the capstan peripheral velocity. More particularly, the magazine has a base window and a leading edge window. The base window registers over the retracted pinch roller and is of sufficient extent to accommodate the swing of the pinch roller to erect position. The leading edge window permits the capstan and the recording (or reproducing) head to bear against the tape. The latter is in the form of a Möbius loop with guide elements directing it along the leading edge window and just within the confines of the magazine.

When inserted, the leading edge of the magazine bears against and displaces a feeler arm. This arm is linked to a crank mechanism bearing against the pinch roller and swings the same to substantially erect position when deflected by the insertion of the magazine. Throughout this movement the magazine has a high mechanical advantage in relation to the pinch roller so that relatively small magazine (and feeler arm) movement swings the pinch roller up through the base window of the magazine. Displacement of feeler arm by the leading edge of the magazine also closes the contacts of a switch which energizes a solenoid which swings a cam to drive the pinch roller in tight tape gripping relation to the capstan. The solenoid works at a high degree of efficiency because of the favorable lever and cam action provided.

It is therefore a general object of the present invention to provide an automatic tape drive mechanism that automatically grips and transports tape in a magazine upon insertion of the magazine.

It is another object of the present invention to provide an automatic tape drive mechanism which coacts with a tape magazine having a leading edge window and a base window to grip and transport the tape through a pinch roller mechanism.

It is a further object of the present invention to provide an automatic tape drive mechanism including a pinch roller and a feeler arm, the latter, upon being engaged by the magazine, being operable to erect the pinch roller automatically to a position adjacent the tape.

Still another object of the present invention is to provide an automatic tape drive mechanism of the foregoing type in which the pinch roller is automatically drawn to tape-gripping position after being mechanically erected by the insertion of the magazine.

It is still a further object of the present invention to provide an automatic tape drive mechanism having means operated by insertion of the magazine to grip the tape, unlock the magazine tape support reel and, if desired, to energize the power elements.

It is yet a further object of the present invention to provide an automatic tape drive mechanism that is reliable in operation, is energized by mere insertion of a magazine, is composed of simple and inexpensive elements, is efficient in use, receives a conventional Möbius loop type tape magazine, and is of form and configuration suitable for use in an attractive tape recording or reproducing unit.

The novel features which I believe to be characteristic of my invention are set forth in the appended claims. My invention itself, however, both as to its organization and method of operation, together with further objects and advantages thereof, will best be understood by reference to the following description taken in conjunction with the accompanying drawings in which:

Figures 1, 2:
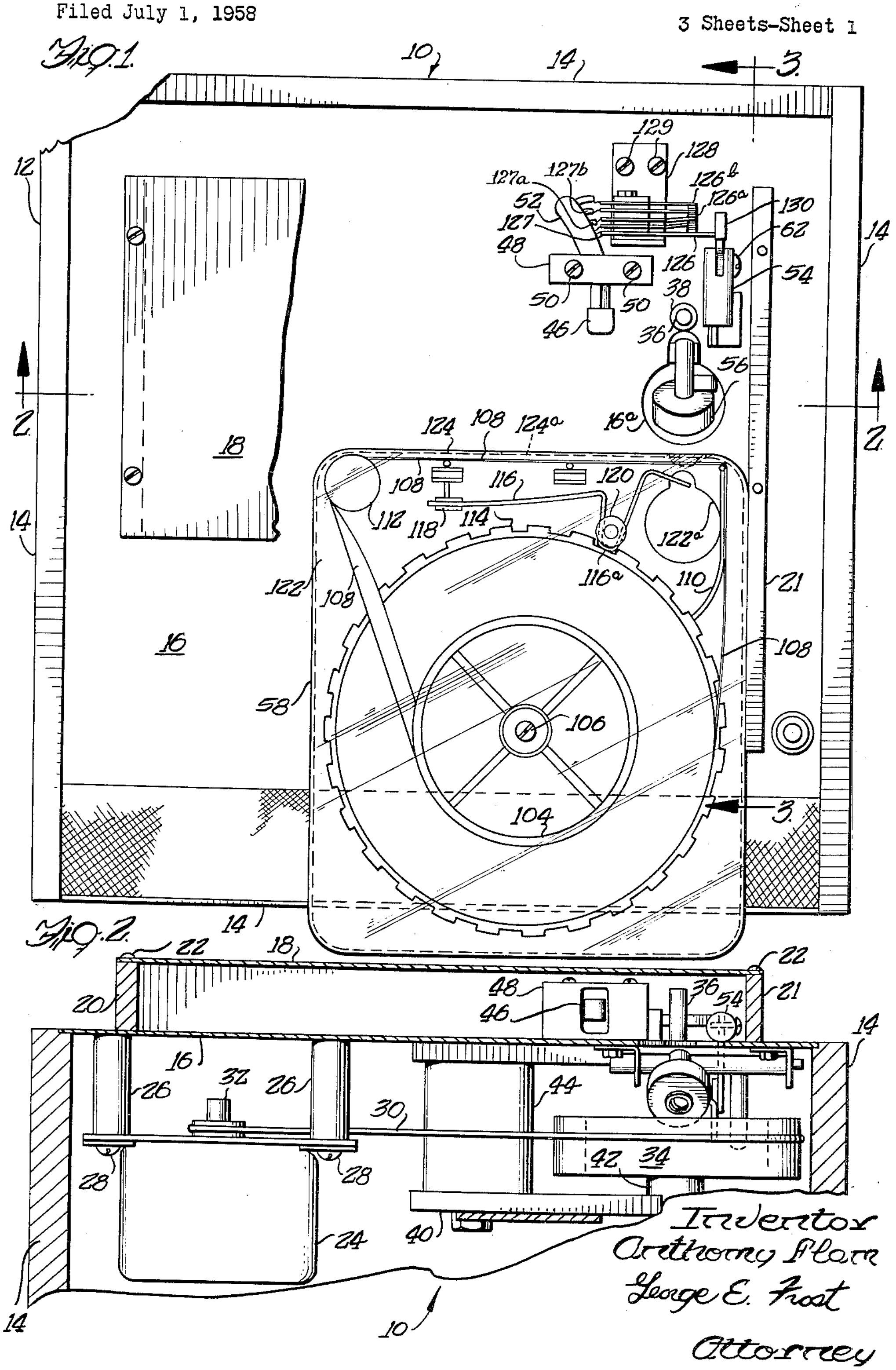
FIGURE 1 is a top plan view, with parts broken away, of an automatic tape drive mechanism made in accordance with the present invention.
FIGURE 2 is a cross-sectional view through axis 2—2, FIGURE 1.
Figure 3:
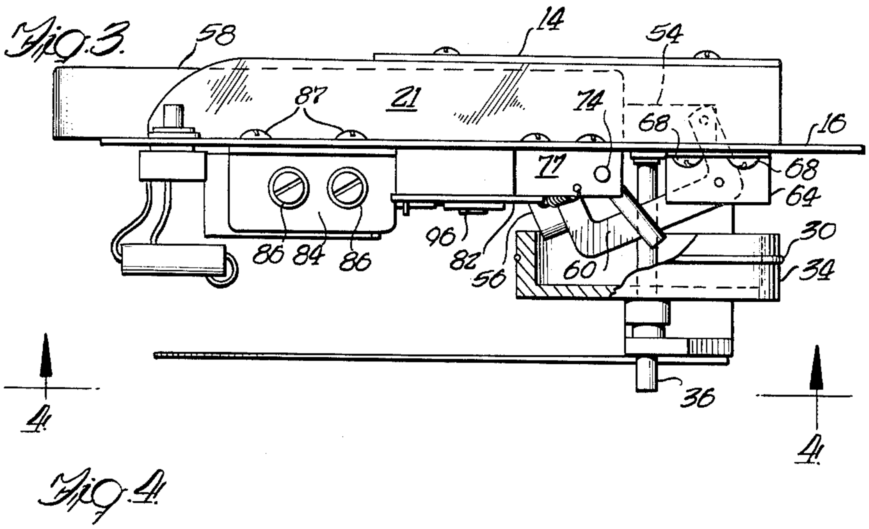
FIGURE 3 is a cross-sectional view through axis 3—3, FIGURE 1.

There is shown generally at 10, FIGURES 1 and 2, a tape recorder operable for recording or reproducing sound which contains the automatic tape drive mechanism made in accordance with the present invention. The unit is housed in container 12 having walls 14. The container 12 is separated into a lower chamber and an upper chamber by horizontal platform 16. A top plate 18, vertically spaced from platform 16 by posts 20 defines the upper chamber. The top plate 18 is affixed to the vertical plates 20 and 21 by screws 22. As best seen in FIGURE 2, motor 24 is suspended from platform 16 by posts 26 and is attached thereto by screws 28. Belt 30 extends around shaft 32 of motor 24 and around capstan flywheel 34 to rotate same when the motor is energized. The capstan 36, mounted in flywheel 34, extends into the upper chamber through a hole 38 bored in platform 16 where it engages the tape 108 as will be described in more detail hereinafter. The flywheel 34 is supported in spaced relation from bottom plate 40 in bearing 42. Post 44 separates platform 16 and bottom plate 40.

The sound pickup head 46 is received in mount 48 which is affixed to platform 16 by screws 50. Cable 52 covers the wiring leading to the various tape recorder circuits. The cable 52 passes from the upper chamber to the lower chamber through platform 16 as seen in FIGURE 1.

The tape drive mechanism of the present invention generally comprises feeler arm 54, capstan 36, pinch roller 56 and solenoid 80. As will be described in more detail hereinafter, insertion of a magazine 58 having tape 108 will automatically cause the tape to be gripped between the pinch roller 56 and capstan 36 and transported across sound head 46 so that the recorder 10 may reproduce the sound contained on the tape or may impress sound on the tape.

Figure 6:
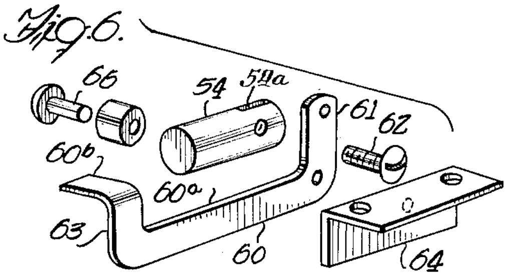
FIGURE 6 is an exploded perspective view of the crank portion of the tape drive mechanism.

As best seen in FIGURES 1, 3, 6, 7, and 8 feeler arm 54 is in the form of an elongated cylinder with a clevis 54*a* in one end. The feeler arm 54 rests on platform 16 and is adapted to bear against and be rearwardly displaced by the leading edge of magazine 58 when inserted. Arm 61, FIGURE 6, of a substantially U-shaped crank 60 fits into clevis 54a and is pivotally secured thereto by screw 62. Arm 61 extends down and into the lower chamber and is pivoted to bracket 64 by pin 66 (FIGURES 6 and 9). Bracket 64 depends below platform 16 and is affixed thereto by screws 68, FIGURE 7. The web portion 60a of crank 60 extends substantially parallel to platform 16 outwardly towards magazine 58. The other arm 63 of crank 60 extends towards platform 16 and has a face portion 60b which is bent inboard and substantially parallel to platform 16.

Figure 4:
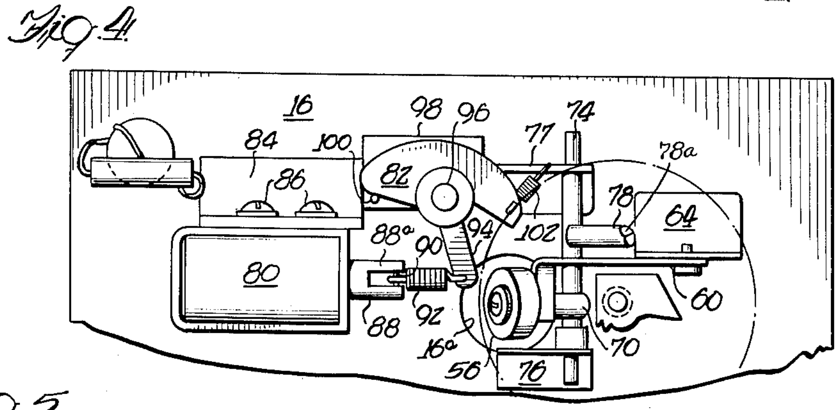
FIGURE 4 is a fragmentary cross-sectional view through axis 4—4, FIGURE 3, showing the tape drive mechanism in unenergized position.
Figure 5:
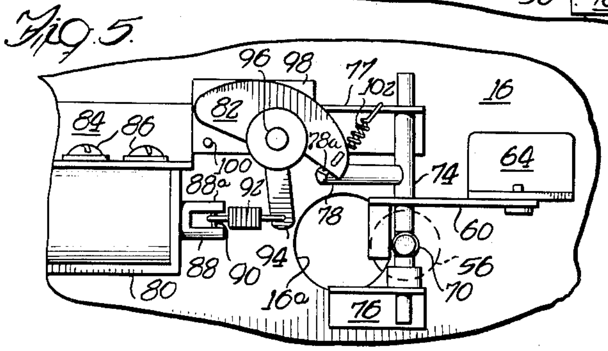
FIGURE 5 is a fragmentary cross-sectional view like FIGURE 4 showing the tape drive mechanism in energized position.

Pinch roller 56, made of rubber or like material, is rotatably mounted on shank or shaft 70 and is secured thereon by screw 72. Shank 70 is affixed to rod or shaft 74 by welding or other similar method (not shown). The rod 74 is rockably supported at both ends by brackets 76 and 77 (FIGURE 5) which depend from platform 16 as best seen in FIGURES 4 and 5. Inboard of shank 70 and extending at substantially a right angle thereto and away from the magazine 58 is an arm 78 which is attached by welding or other means to rod 74. The above elements are retracted below the platform 16 at the time the magazine is inserted.

Also located within the confines of the lower chamber are solenoid 80 and cam plate 82. As best seen in FIGURES 4 and 5, solenoid 80 is mounted by screws 86 on bracket 84, which depends from and is affixed to platform 16 by screws 87. Armature 88 of solenoid 80 has a clevis part 88a and a pin 90 to which is attached one end of spring 92. The other end of spring 92 is received in arm 94 of cam plate 82. The cam plate which is a flat disc semi-circular in conformation, is rotatably mounted on pin 96 which is received in block 98. The block 98 depends from platform 16 and has a stop pin 100 at one corner. One end of cam 82 rests against stop pin 100 when the cam is not actuated. The other end of cam 82 is secured to spring 102, the other end of which is affixed to bracket 77. Consequently, cam 82 is biased against stop pin 100 and rests thereagainst when solenoid 80 is deenergized.

Tape magazine 58 slides along platform 16 in the upper chamber and is guided by vertical plate 21. The housing of the magazine is rectangular in conformation and is preferably of clear plastic, such as polystyrene. The magazine has a platform or reel 104 rotatably mounted on upstanding pin 106 to receive the tape in a Möbius loop. That is, the tape is in the form of an annular roll from which it comes out at the outer periphery, passes sound head 46, is twisted 180° and rewound onto the inner periphery. When tape 108 is unwinding, it is guided by guideplate 110, to the leading edge of the magazine, across the leading edge of the magazine to roller 112, and then in a 180° twist returns to the inner periphery of the roll. A serrated disc 114 is mounted on shaft 106 and serves to support that roll. A wire spring 116 is secured to post 118 at one end, and loops around pin 120 to form a bight 116a which extends into a serration of disc 114 to lock the same against movement. Outboard bight 116a, the spring 116 extends over opening 122a to be engaged by the pinch roller shank 70 and release the brake as described in more detail hereinafter.

Magazine 58 has a base 122 and a wall 124. The base hase a base window 122a which is of the same dimensions as window 16a of platform 16 and coextensive therewith when the magazine 58 is fully inserted. Wall 124 defines a leading edge and also has a window 124a which is of sufficient extent to accommodate sound head 46 and capstan 36 within the confines of magazine 58 when fully inserted so that, in use, the tape 108 bears against the sound head 46 and capstan 36 as hereafter described.

It will be noted that a number of switch elements 126a, 126b, etc. are located adjacent sound head 46 and mounted on block 128 which is secured in the upper chamber to platform 16 by screws 129. A series of wires, 127, 127a, 127b, etc. connect their respective switches to appropriate circuit elements and are bound together in cable 52 as shown in FIGURE 1. The switches are actuated by spring arm 126 which is affixed to movable element 130. Arm 61 of crank 60 bears against element 130 as best seen in FIGURES 1, 7, 8 and 9 so that movement of feeler arm 54 by magazine 58 will displace movable element 130 and which closes the switches 126a, 126b, etc. and make the circuit connections required for operation of the unit.

Figures 7, 8, 9:
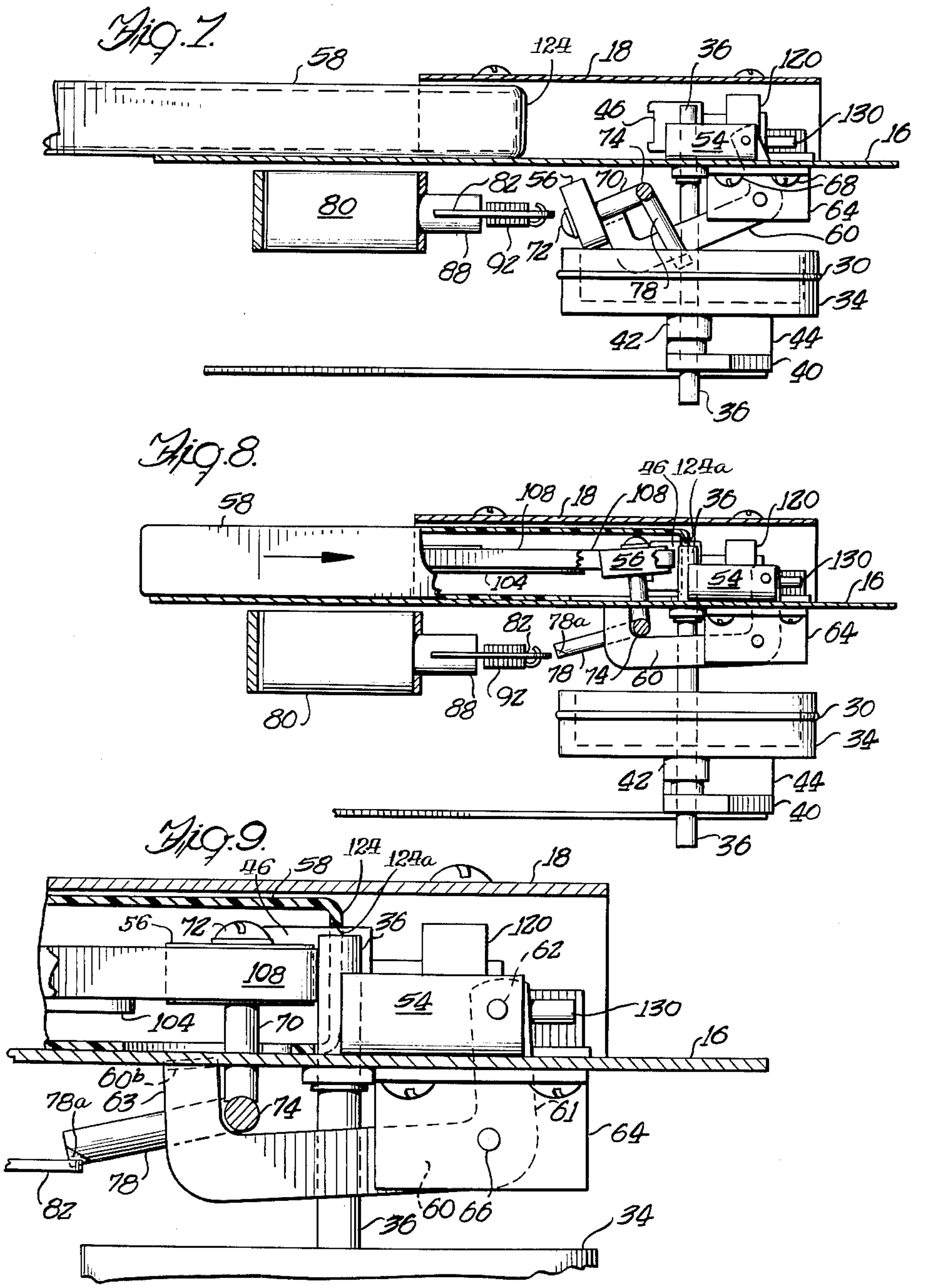
FIGURES 7, 8 and 9 are fragmentary cross-sectional views like FIGURE 3 showing the sequential operation of the tape drive mechanism with parts broken away to show the construction more clearly, FIGURE 9 being to a somewhat enlarged scale to show the parts more clearly.

In order to energize the automatic tape drive mechanism, the operator need only insert the magazine 58 into the upper chamber and move it along platform 16, guided by vertical plate 21. The tape mechanism is shown in the initial insertion of magazine 58 in FIGURE 7. The leading edge 124 passes over window 16a in platform 16 and engages feeler arm 54. The leading edge window 124a allows sound head 46 and capstan 36 to extend into the confines of magazine 58. Further insertion of magazine 58 moves feeler arm 54 initially inwardly to rotate crank 60 about pivot 66 in the clockwise direction as seen in FIGURES 7–9. The link is so constructed that a relatively small displacement of arm 61 is magnified many times through web 60 to displace arm 63 a proportionally greater amount. Face 60b, which engages shank 70 of pinch roller 56, lifts the pinch roller about the horizontal axis defined by rod 74 up through window 16a of platform 16 and window 122a of base 122 of magazine 58 to substantially erect position as seen in FIGURE 8. At this time, the tape 108 bears against capstan 36 and is received against sound head 46 so that the pinch roller 56, when initially lifted travels behind the tape. Arm 78, which is affixed to rod 74, is also displaced to a position adjacent cam plate 82, FIGURE 8.

The shank 70 of pinch roller 56 engages the free end of spring 116 located over base window 122a of magazine 58 to flex the spring counterclockwise and free bight 116a from serrated disc 114 to unlock reel 104 for rotation. Full insertion of the magazine 58 by the operator displaces feeler arm 54 to its roller-erecting position. Movable element 130 is displaced by crank 60 which in turn moves spring arm 126 to actuate the switches 126a, 126b, etc. Switch 126a, when closed, energizes solenoid 80 to move armature 88 from the position shown in FIGURE 4 to that shown in FIGURE 5. The armature 88, connected to arm 94 of cam plate 82 through spring 92, rotates cam plate 82 about its vertical axis defined by pin 96, FIGURES 4 and 5, from the position shown in FIGURE 4 to that shown in FIGURE 5. It will be noted that the lower end of arm 78 of pinch roller 56 is in a position such that its end is slightly below the plane of the cam 82 as best seen in FIGURE 8. The arm 78 has an angular flat 78a cut in its end (FIGURE 9) whose leading edge is in the same plane as the cam 82. As the cam rotates, it will ride against the angular notch 78a, camming the arm 78 in the vertical direction until the pinch roller 56 has completed its throw and presses the tape against capstan 36 in firm engagement. This is seen in FIGURES 5 and 9. At this time the pinch roller 56 frictionally sandwiches tape 108 against capstan 36 so that rotation of the capstan transports the tape across the sound head 46 without slip.

The other switches, 126a, 126b, etc. which are also actuated by magazine 58 when in its roller-erecting position, may, for example, energize motor 24 which rotates capstan 36 and energize the sound reproducing elements of the reproducer, such as the amplifier and loudspeaker (not shown). These switches, however, do not form a part of the present invention and are optional, depending upon the desire of the user.

From the foregoing it will be evident that the apparatus above described serves to erect the pinch roller 56 under the mechanical action of the magazine being inserted and to press the pinch roller in gripping engagement against the tape in automatic fashion when the magazine is inserted. Moreover, the solenoid 80 is only called upon to supply energy for the final tape-gripping action and accordingly may be of relatively small size.

While I have shown and described a specific automatic tape drive mechanism embodying the present invention it will, of course, be understood that various modifications and alternative constructions can be made without departing from the true spirit and scope of the invention. I therefore intend by the appended claims to cover all such alternatives falling within the true spirit and scope thereof.

What I claim as new and desire to secure by Letters Patent of the United States is:

1. An automatic tape drive mechanism for use with a source of electric power and adapted to receive a magazine having a wall defining a leading edge window and a base defining a base window and automatically operable to grip tape in the region of the leading edge window and transport same, the mechanism comprising: a horizontal platform separating an upper chamber and a lower chamber, the platform having means to receive the magazine in a given position in the upper chamber; a rotatable capstan extending up through the platform into the upper chamber; means connected to the capstan and located in the lower chamber to rotate said capstan; a pinch roller having a shank; a rotatable horizontal rod located in the lower chamber connected to said shank for swinging the pinch roller through said base window when said magazine is in said position between an upstanding tape-gripping position adjacent the capstan in the upper chamber and a retracted position in the lower chamber; an arm on said rod swingable between an inwardly extending position when the pinch roller is in the retracted position and an outwardly extending position when said pinch roller is in the tape-gripping position; a movable feeler arm on the platform in the upper chamber positioned to bear against the magazine and be moved from a first to a second position by insertion of the magazine into said given position; crank means pivotally connected at one end in the upper chamber to the feeler arm and having a face at its other end underlying the shank of the pinch roller, the crank being mounted for pivotal movement about a horizontal axis and swingable as the feeler arm is moved by the magazine from said first toward said second position to lift the pinch roller to substantially upstanding position in the upper chamber and to swing the arm to its outwardly extending position; actuating means associated with said feeler arm and including a solenoid located in the lower chamber, having an armature and energized by said source of power in response to said feeler arm being moved to said second position by the magazine; and a cam plate connected to said armature and located in the lower chamber, said plate being movable about a vertical axis to engage said arm when the arm is in said outwardly extending position and to wedge the arm in a direction such that the pinch roller is urged toward the capstan to apply tape-gripping pressure against the capstan whereby insertion of the magazine lifts the pinch roller in two stages to tape-gripping position in the upper chamber.

2. An automatic tape drive mechanism for use with a source of electrical power and adapted to receive a magazine having a wall defining a leading edge window and a base defining a base window, and automatically operable to grip tape in the region of the leading edge window and transport the same, comprising in combination: frame means to receive and support the magazine in a given position; a capstan mounted on said means and positioned adjacent said leading edge window when said magazine is in said position; a pinch roller mounted on a shaft and normally positioned below said base window when said magazine is in said position; movable means having a forward side and a rearward side, said movable means pivotally mounting said shaft on said frame means for movement in the direction said forward side is facing from a retracted position below said magazine position to an upstanding position at which said roller is in juxtaposition to said capstan in position to grip said tape, said movable means having a lever part; a feeler arm movably mounted on said frame means and positioned to be pushed by the magazine when the magazine is inserted into said given position; a lever pivotally mounted on said frame means and connected to said feeler arm to be moved thereby, said lever having a pushing portion positioned at the rearward side of said movable means to apply pressure to said rearward side to move said movable means in said direction to a position at which said shaft is substantially in said upstanding position when said feeler arm is moved by the insertion of said magazine, whereby the movable means is free to further move in said direction independently of the pressure of said portion; an electrical switch means mounted on said frame means for actuation by the insertion of said magazine; a solenoid connected to said switch means to be energized by said source of power upon said actuation; and means connected to said solenoid and positioned to contact said lever part, upon the energizing of said solenoid, only after said movable means has reached about said upright position of said shaft and to move said movable means away from said pushing portion in said direction to press said roller toward said capstan to pinch the tape between the roller and capstan.

3. An automatic tape drive mechanism for use with a source of electrical power adapted to receive a magazine having a wall defining a leading edge window and a base defining a base window, and automatically operable to grip tape in the region of the leading edge window and transport the same, comprising in combination: frame means to receive and support the magazine in a given position; a capstan mounted on said means and positioned adjacent said leading edge window when said magazine is in said position; a pinch roller mounted on a shaft and normally positioned below said base window when said magazine is in said position; movable means having a forward side and a rearward side, said movable means pivotally mounting said shaft on said frame means for movement in the direction said forward side is facing from a retracted position below said magazine position to an upstanding position at which said roller is in juxtaposition to said capstan in position to grip said tape, said movable means having a lever part with a camming surface thereon at the rearward side of said lever part; a feeler arm movably mounted on said frame means and positioned to be pushed by the magazine when the magazine is inserted into said given position; a lever pivotally mounted on said frame means and connected to said feeler arm to be moved thereby, said lever having a pushing portion positioned at the rearward side of said movable means to apply pressure to said rearward side to move said movable means in said direction substantially to a position at which said shaft substantially is in said upright position as said feeler arm is moved by the insertion of said magazine, whereby the movable means is free to further move in said direction independently of the pressure of said portion; an electrical switch means mounted on said frame means for actuation by the insertion of said magazine; a solenoid connected to said switch means to be energized by said source of power by the actuation of the switch means; and a cam rotatably mounted for movement between an effective and a noneffective position, said cam being resiliently urged to said noneffective position, said effective position approximately coinciding with the position of said camming surface when said shaft is about in said upright position, said cam being connected to said solenoid to be moved to said effective position upon the energizing of said solenoid, said cam being positioned at the rearward side of said camming surface when said shaft is in about said upright position to urge said movable means in said direction away from said pushing portion; whereby said cam is ineffective to act on said movable means unless said movable means has been moved to its said position by said pushing portion of said lever and when said cam does contact said camming surface under the urging of said solenoid said movable means is moved away from said pushing portion in said direction to press said roller towards said capstan to pinch the tape between the roller and capstan.

4. An automatic tape drive mechanism for use with a source of electrical power and adapted to receive a magazine having a wall defining a leading edge window and a base defining a base window and automatically operable to grip tape in the region of the leading edge window and transport the same, comprising in combination: a platform adapted to receive the magazine in a given position; a rotatable capstan on the platform and upstanding therefrom; means connected to said capstan to rotate said capstan; a second means including a pinch roller swingably mounted beneath the platform and swingable through said base window, when said magazine is in said position, between an upstanding tape-gripping position adjacent the capstan and a retracted position below the platform; a movable feeler arm on the platform positioned to bear against the magazine and be moved from a first to a second position by insertion of said magazine; means attached to the feeler arm and operatively connected to said second means to lift the pinch roller to substantially upstanding position when the feeler arm is initially contacted and moved by said magazine toward said second position; a fourth means including a solenoid having an armature, said fourth means being operatively connected to said feeler arm to energize said solenoid from said power source when said feeler arm is moved to said second position; fifth means including a cam and cam follower respectively attached to the armature and connected to said second means, said fifth means having a force-increasing lever relationship between the armature and the second means to wedge the pinch roller toward the capstan when said solenoid is energized to apply tape-gripping pressure, whereby insertion of the magazine lifts the pinch roller in two stages to tape-gripping position.

5. An automatic tape drive mechanism for use with a source of electric power and adapted to receive a magazine having a wall defining a leading edge window and a base defining a base window and automatically operable to grip tape in the region of the leading edge window and transport the same, the mechanism comprising: a horizontal platform defining an upper chamber and a lower chamber, the platform being adapted to receive the magazine in a given position in the upper chamber; a rotatable capstan extending up through the platform into the upper chamber; means connected to said capstan and located in the lower chamber to rotate said capstan; a second means including a pinch roller swingably mounted in the lower chamber and swingable through said base window, when said magazine is in said position, between an upstanding tape-gripping position extending into the upper chamber and pressing against the capstan and a retracted position in the lower chamber; a movable feeler arm on the platform in the upper chamber positioned to bear against the magazine and be moved from a first to a second position by the insertion of the magazine; crank means pivotally attached at one end in the upper chamber to the feeler arm and operatively connected to the second means at the other end in the lower chamber, the crank means being mounted for pivotal movement about a horizontal axis and swingable as the feeler arm is moved by the magazine from said first toward said second position to lift the pinch roller to substantially upstanding position in the upper chamber; actuating means associated with said feeler arm and including a solenoid located in the lower chamber, having an armature and energized by said source of power in response to said feeler arm being moved to said second position by the magazine; fifth means located in the lower chamber, said fifth means including a cam and cam follower respectively attached to the armature and connected to said second means to wedge the pinch roller toward the capstan when said solenoid is energized to apply tape-gripping pressure, whereby insertion of the magazine lifts the pinch roller in two stages to tape-gripping position in the upper chamber.

6. An automatic tape drive mechanism for use with a source of electrical power and adapted to receive a magazine and automatically operable to grip tape in the magazine and transport the same, the mechanism comprising in combination: a platform; a rotatable capstan on the platform and upstanding therefrom; means connected to the capstan to rotate the capstan; a magazine received on said platform in a given position and having a wall defining a leading edge window in juxtaposition to said capstan, and a base defining a base window, said magazine being removable from said position and insertable to said position; a reel on said magazine carrying tape and having a serrated disk; spring means mounted on said magazine and adapted to engage the serrated disk to lock the reel against rotation; a third means including a pinch roller swingably mounted beneath the platform and swingable through said base window when said magazine is in said position between an upstanding tape-gripping position adjacent the capstan and a retracted position below the platform; a movable feeler arm on the platform adapted to bear against the magazine and be moved from a first to a second position by insertion of the magazine; means attached to the feeler arm and operatively connected to the pinch roller to lift the pinch roller through the base window to substantially upstanding position when the feeler arm is initially contacted and moved by the magazine when said magazine is initially inserted and moved toward said position; the third means being operatively associated with said spring means to move said spring means out of engagement with the serrated disk to unlock the reel as said pinch roller moves away from said retracted position toward said upstanding position; means including a solenoid energized by said source of power when said magazine is in said position and operatively connected to the third means to complete the throw of the pinch roller and urge the roller toward the capstan, whereby insertion of the magazine lifts the pinch roller in two stages to tape-gripping position.

References Cited in the file of this patent

UNITED STATES PATENTS

| | | |
|---|---|---|
| 2,668,021 | Gleason | Feb. 2, 1954 |
| 2,778,880 | Eash | Jan. 22, 1957 |
| 2,788,209 | Montijo | Apr. 9, 1957 |
| 2,864,611 | Gray | Dec. 16, 1958 |